United States Patent
Salloum et al.

(10) Patent No.: US 8,661,412 B2
(45) Date of Patent: Feb. 25, 2014

(54) MANAGING AUTOMATED AND MANUAL APPLICATION TESTING

(75) Inventors: Ghassan G. Salloum, Seattle, WA (US); Deepak P. Kumar, Kirkland, WA (US); Gaurav P. Bhandari, Redmond, WA (US); Benjamin T. Grover, Issaquah, WA (US); Ashima Jain, Bellevue, WA (US); Brian D. Anger, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 444 days.

(21) Appl. No.: 12/950,400

(22) Filed: Nov. 19, 2010

(65) Prior Publication Data
US 2012/0131387 A1   May 24, 2012

(51) Int. Cl.
*G06F 9/44* (2006.01)

(52) U.S. Cl.
USPC .................. 717/124; 717/127; 717/129

(58) Field of Classification Search
USPC ............................. 717/124–130
See application file for complete search history.

(56) References Cited

U.S. PATENT DOCUMENTS

| | | | | |
|---|---|---|---|---|
| 6,961,873 B2* | 11/2005 | Dubovsky | .................. | 714/38.13 |
| 7,100,151 B2* | 8/2006 | Johnsen et al. | ................ | 717/128 |
| 7,203,929 B1* | 4/2007 | Vinodkrishnan et al. | ..... | 717/124 |
| 7,490,319 B2* | 2/2009 | Blackwell et al. | ............ | 717/124 |
| 7,506,312 B1* | 3/2009 | Girolami-Rose et al. | .... | 717/124 |
| 7,568,183 B1* | 7/2009 | Hardy et al. | .................. | 717/121 |
| 7,596,778 B2* | 9/2009 | Kolawa et al. | ................ | 717/126 |
| 7,752,606 B2* | 7/2010 | Savage | .......................... | 717/135 |
| 7,840,844 B2* | 11/2010 | Garland et al. | ................. | 714/33 |
| 7,890,806 B2* | 2/2011 | Kwong et al. | ................. | 717/124 |
| 7,895,565 B1* | 2/2011 | Hudgons et al. | .............. | 717/106 |
| 7,984,429 B2* | 7/2011 | Hunt | ............................. | 717/130 |
| 8,074,204 B2* | 12/2011 | Comstock et al. | ............. | 717/125 |
| 8,296,734 B2* | 10/2012 | Geppert et al. | ................ | 717/124 |
| 8,356,282 B1* | 1/2013 | Leippe et al. | .................. | 717/125 |
| 8,495,585 B2* | 7/2013 | Miller | ............................ | 717/127 |
| 8,543,986 B2* | 9/2013 | Murthy et al. | ................. | 717/126 |
| 2007/0168734 A1 | 7/2007 | Vasile | | |

FOREIGN PATENT DOCUMENTS

GB      2450859 A     1/2009

OTHER PUBLICATIONS

Gerlich et al, "Random Testing: From the Classical Approach to a Global View and Full Test Automation", ACM, pp. 30-37, 2007.*
Seo et al, "Automating Embedded Software Testing on an Emulated Target Board", IEEE, pp. 1-7, 2007.*

(Continued)

*Primary Examiner* — Anil Khatri
(74) *Attorney, Agent, or Firm* — Andrew Sanders; Micky Minhas; Wolfe-SBMC (57) ABSTRACT

An application for which approval is requested is identified and multiple automated tests are applied to the application in groups of automated tests. Each of the groups of automated tests includes multiple ones of the multiple automated tests. If one or more automated tests in a group of automated tests returns an inconclusive result, then a manual check is initiated for the application based on the one or more automated tests that returned the inconclusive result. If one or more automated tests in a group, or a manual test applied in the manual check, returns a fail result then an indication that the application is rejected is returned, the indication that the application is rejected including an identification of why the application is rejected. If none of the multiple automated tests returns a fail result, then a manual testing phase is initiated.

20 Claims, 6 Drawing Sheets

(56) References Cited

OTHER PUBLICATIONS

Jensen et al, "Automated Testing with Targeted Event Sequence Generation", ACM, pp. 67-77, 2013.*

Wassermann et al, "Dynamic Test Input Generation for Web Applications", ACM, pp. 249-259, 2008.*

Derrien, Dom., "Automatic Testing of GAE Applications", Retrieved at <<http://domderrien.blogspot.com/2009/01/automatic-testing-of-gae-applications.html >>, Jan. 25, 2009, pp. 9.

"Verification", Retrieved at <<http://wiki.developers.facebook.com/index.php/Verification >>, Retrieved Date: Sep. 1, 2010, pp. 5.

"Testopia", Retrieved at <<http://www.mozilla.org/projects/testopia/ >>, Retrieved Date: Sep. 1, 2010, pp. 5.

"What's New for Testing", Retrieved at <<http://msdn.microsoft.com/en-us/library/bb385901.aspx >>, Retrieved Date: Sep. 1, 2010, pp. 6.

"How to Group Test Cases Class using JUnit TestSuite?", Retrieved at <<http://sqa.fyicenter.com/FAQ/JUnit/How_To_Group_Test_Cases_Class_using_JUnit_TestSu.html >>, Retrieved Date: Sep. 1, 2010, pp. 3.

"Running Test Cases", Retrieved at <<http://dev.mysql.com/doc/mysqltest/2.0/en/running-tests.html >>, Retrieved Date: Sep. 1, 2010, pp. 2.

* cited by examiner

MANAGING AUTOMATED AND MANUAL APPLICATION TESTING

BACKGROUND

Applications are typically tested before they are made available to users for running on their computers. Testing applications typically identifies problems and other issues with the applications that can be fixed by the application developer, resulting in an improved user experience. However, testing applications is not without its problems. One such problem is the accuracy and cost of testing applications. Current testing can result in missing errors that would not be missed by a human tester, and/or can be time-consuming and expensive.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, at one or more computing devices an application for which approval is requested is identified. Multiple automated tests are applied to the application in groups of automated tests, each of the groups of automated tests including multiple ones of the multiple automated tests. For each of the groups of automated tests, after applying the automated tests in the group an indication that the application is rejected is caused to be returned if one or more of the automated tests in the group returns a fail result. This indication that the application is rejected includes an identification of why the application is rejected. If none of the multiple automated tests returns a fail result, a manual testing phase is initiated.

In accordance with one or more aspects, an application for which approval is requested is identified and multiple automated tests are applied to the application. Prior to completing all of the multiple automated tests and for one of the multiple automated tests that returns an inconclusive result, a manual check is initiated for the application based on the one automated test. The inconclusive result indicates that the one automated test cannot determine whether the application is to receive a fail result or a pass result.

BRIEF DESCRIPTION OF THE DRAWINGS

The same numbers are used throughout the drawings to reference like features.

DETAILED DESCRIPTION

Managing automated and manual application testing is discussed herein. Applications are submitted to a testing system, which analyzes the applications and determines whether each application is approved or rejected based on various criteria. The testing system initially applies multiple automated tests to the application in groups of automated tests. Each automated test can return a pass result indicating that the application passed the test, or a fail result indicating that the application failed the test. One or more automated tests can also return an inconclusive result, indicating that the automated test was unable to determine whether the application passed or failed the test. In response to an inconclusive result, a manual check is initiated in which one or more people apply one or more manual tests to the application, and return a pass result or a fail result. If one or more automated tests in a group, or one or more manual tests, returns a fail result for the application, then an indication that the application is rejected is returned (e.g., to the application developer). The indication that the application is rejected identifies why, based on the one or more tests that returned the fail result, the application is rejected. The application developer is then able to modify the application and re-submit the application to the testing system.

After all the automated tests have been applied and returned a pass result, then one or more manual tests of a manual testing phase are initiated. If one or more manual tests returns a fail result for the application, then an indication that the application is rejected is returned (e.g., to the application developer) identifying why, based on the one or more manual tests that returned the fail result, the application is rejected. After all the manual tests have been applied and returned a pass result, then an indication that the application is approved is returned (e.g., to the application developer), indicating that the application is approved by the testing system.

Figure 1:
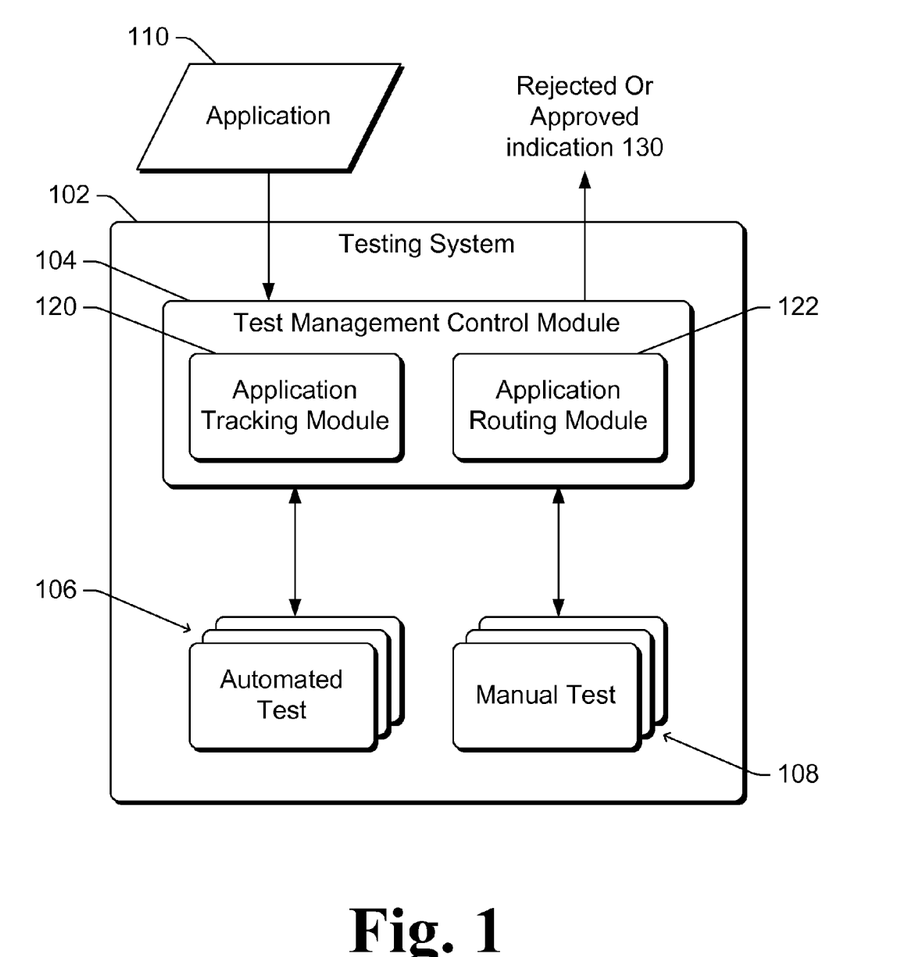
FIG. 1 illustrates an example system implementing the managing automated and manual application testing in accordance with one or more embodiments.

FIG. 1 illustrates an example system implementing the managing automated and manual application testing in accordance with one or more embodiments. A testing system 102 includes a test management control module 104, multiple automated tests 106, and multiple manual tests 108. Test management control module 104 can be implemented by one or more of a variety of different types of computing devices, such as a server computer, a desktop computer, a netbook or laptop computer, a notepad or tablet computer, a mobile station, an entertainment appliance, a set-top box communicatively coupled to a display device, a television, a cellular or other wireless phone, a game console, an automotive computer, and so forth. Similarly, automated tests 106 can be implemented by one or more of a variety of different types of computing devices, and can be implemented by the same or different devices than implement test management control module 104.

Manual tests 108 are implemented at least in part on one or more computing devices, which can be a variety of different types of computing devices such as a server computer, a desktop computer, a netbook or laptop computer, a notepad or tablet computer, a mobile station, an entertainment appliance, a set-top box communicatively coupled to a display device, a television, a cellular or other wireless phone, a game console, an automotive computer, and so forth. Manual tests 108 are also typically based at least in part on human involvement, as discussed in more detail below.

It should be noted that testing system 102 can be distributed across a wide physical area. For example, test management control module 104 and automated tests 106 can be implemented on computing devices in one data center, and different ones of manual tests 108 can be implemented in different locations (e.g., different buildings, different cities, different countries, etc.). By way of another example, test management control module 104 can be implemented on computing devices in one data center, automated tests 106 can be implemented on computing devices in one or more other data centers, and different ones of manual tests 108 can be implemented in different locations.

Generally, an application 110 for which approval is requested is received by testing system 102. Application 110 can be received directly from the developer of application 110, or alternatively via one or more intermediaries. In one or more embodiments, the approval that is requested is an approval for the application to be made available to users through a particular store (e.g., an online or electronic store) or other repository, although approval for other actions or rights can alternatively be requested. Testing system 102 initially evaluates application 110 using automated tests 106. Testing system 102 can also initiate one or more manual tests 108 at different points during the evaluation. Which automated tests 106 and/or manual tests 108 are to be applied to analyze application 110, as well as the timing for when those tests are to be applied, is determined by test management control module 104 as discussed in more detail below. Testing system 102 is discussed with reference to testing a single application: application 110. However, it should be noted that testing system 102 can test multiple applications at the same or different times.

Test management control module 104 includes an application tracking module 120 and an application routing module 122. Application tracking module 120 manages the evaluation or testing of application 110, keeping track of which tests 106 and/or 108 have been applied, and whether to return an indication 130 that application 110 is approved or rejected by testing system 102. Application tracking module 120 can also maintain a record of the results returned by the tests 106 and/or 108 that have been applied. Alternatively, a record of which tests 106 and/or 108 have been applied, and the results returned by those tests, can be maintained in different manners. For example, a testing record can be associated with application 110, and each test 106 and/or 108 can update the record to reflect the result returned by that test.

Application routing module 122 manages the routing of application 110 to the appropriate ones of automated tests 106 and/or manual tests 108 at the appropriate times. Application routing module 122 can identify the appropriate test 106 and/or 108 to which application 110 is to be routed at a particular time based on various criteria, including the results of previous tests 106 and/or 108, various characteristics of application 110, and so forth. This identification of the appropriate test 106 and/or 108 to which application 110 is to be routed at a particular time is discussed in more detail below.

Automated tests 106 run without human intervention, and are typically programs or modules (or a portion of a program or module) that run on one or more computing devices in response to a request from test management control module 104 to evaluate an application. Each automated test 106 evaluates application 110 for compliance with one or more policies, and returns a result based on the evaluation. Various different policies can be established based on, for example, the desires of the person or company providing or managing the particular store through which application 110 will be available if approved by testing system 102. Automated tests 106 are designed or otherwise configured to evaluate whether application 110 complies with one or more policies.

By way of example, a policy can be that in order to be approved an application is not malware (e.g., is not or does not include a virus, spyware, or other malware, does not include a link to a phishing web site, etc.). Thus, one or more automated tests 106 can evaluate application 110 to determine whether the application is malware. By way of another example, a policy can be that in order to be approved an application includes appropriate content (e.g., does not include pornographic or other adult-themed content, does not include violent subject matter, does not include slang and/or profanity, etc.). Thus, one or more automated tests 106 can evaluate application 110 to determine whether the application includes appropriate content.

By way of yet another example, a policy can be that in order to be approved an application uses only application programming interfaces (APIs) that are deemed appropriate (e.g., includes only APIs that are included on a particular approved list, does not include APIs that are included on a particular disallowed list, etc.). Thus, one or more automated tests 106 can evaluate application 110 to determine whether the application includes only appropriate APIs. By way of still another example, a policy can be that in order to be approved appropriate metadata is associated with the application (e.g., the application has a title of no more than a particular number of characters, the application has a summary of at least a particular number of characters, etc.). Thus, one or more automated tests 106 can evaluate application 110 to determine whether the application has the appropriate associated metadata.

As a further example, a policy can be that in order to be approved an application satisfies certain performance requirements when the application is running (e.g., processor usage by the application when running does not exceed a threshold amount, memory usage of the application when running does not exceed a threshold amount, network usage of the application when running does not exceed a threshold amount, etc.). Thus, one or more automated tests 106 can evaluate application 110 to determine whether the application satisfies those performance requirements.

Each automated test 106 can operate in a variety of different manners, based on the manner in which the automated test 106 is implemented and the policy for which the automated test 106 is evaluating an application. For example, automated tests 106 can search for particular strings of characters in outputs generated by application 110, analyze the performance of application 110 as application 110 is run, analyze the instructions or code of application 110 for particular patterns, and so forth.

In one or more embodiments, automated tests 106 are grouped together into multiple different groups, each group including multiple ones of automated tests 106. Alternatively, one or more groups can include a single automated test 106. Automated tests 106 are applied to application 110 in groups, with all of the automated tests in a particular group being applied to application 110. The results of the automated tests in a group are evaluated, and application tracking module 120 determines a next action to be taken in evaluating application 110 based on the results of the automated tests in the group.

Automated tests 106 can be grouped into different groups in a variety of different manners. In one or more embodiments, each automated test 106 has an associated test type (e.g., security checking, content appropriateness, metadata restrictions, API usage, application performance, etc.), and automated tests 106 are grouped into groups based on the type of test. For example, tests relating to security checking of application 110 (e.g., whether application 110 is a virus, spyware, or other malware) can be included in one group, tests relating to whether application 110 includes appropriate content (e.g., whether application 110 includes adult or pornographic content) can be included in another group, tests relating to the compliance with metadata restrictions (e.g., whether metadata associated with application 110 includes a title of appropriate length, a summary of appropriate length, etc.) can be included in another group, tests relating to whether application 110 does not employ disallowed APIs (e.g., whether application 110 uses just the allowed APIs) can be included in another group, tests relating to whether application 110 satisfies certain performance requirements when the application is running (e.g., processor usage, network usage, etc.) can be included in another group, and so forth.

In other embodiments, automated tests 106 are grouped into groups based on other criteria. For example, automated tests 106 can be grouped into groups based on the time expected to be used in applying automated tests 106 (e.g., so that the group is expected to take a particular amount of time to complete, does not take in excess of a threshold amount of time to complete, etc.). By way of another example, automated tests 106 can be grouped into groups based on the frequency with which the automated tests 106 return fail results for previously tested applications. By way of yet another example, automated tests 106 can be groups randomly, so that each group includes a particular number (e.g., ten) automated tests 106, based on input received from an administrator or customer of testing system 102, and so forth.

Additionally, application routing module 122 can provide application 110 to groups of automated tests 106 in a particular order. Application routing module 122 can be configured with this order (e.g., being programmed into application routing module 122 or being set by an administrator of testing system 102), or alternatively can obtain an indication of this order from another module or device. For example, tests relating to security checking of application 110 can be the first group of automated tests 106 that are applied to application 110, tests relating to whether application 110 includes appropriate content can be the second group of automated tests that are applied to application 110, and so forth. Alternatively, groups of automated tests 106 can be applied in other manners, such as by selecting groups randomly or according to some other rules or criteria.

Some automated tests 106 return one of two different results: a pass result or a fail result. Other automated tests 106 return one of three different results: a pass result, a fail result, or an inconclusive result. A pass result for application 110 indicates that application 110 satisfies whatever policy (or policies, or portion of a policy or policies) for which the automated test 106 is evaluating application 110. A fail result for application 110 indicates that application 110 does not satisfy whatever policy (or policies, or portion of a policy or policies) for which the automated test 106 is evaluating application 110. The fail result returned by an automated test 106 can also include an identification of why application 110 failed. The information identifying why application 110 failed can vary by automated test 106 and by implementation, and can be, for example, a descriptive string (e.g., identifying particular strings or instructions of application 110 that did not comply with the policy), an error code, other descriptive information, and so forth.

An inconclusive result for application 110 indicates that the automated test 106 cannot determine whether application 110 satisfies whatever policy (or policies, or portion of a policy or policies) for which the automated test 106 is evaluating application 110, and that automated test 106 cannot determine whether to return a pass result or a fail result. An automated test 106 may not be able to determine whether to return a pass result or a fail result for a variety of different reasons. For example, depending on the manner in which it is used a particular word or phrase may or may not be appropriate, a particular image may or may not include violent and/or adult-themed content, and so forth.

Application routing module 122 provides application 110 (e.g., communicates application 110, communicates a pointer or other identifier of where application 110 is stored, etc.) to a group of automated tests 106. Application tracking module 120 receives the results returned by the automated tests 106 in that group. Application routing module 122 can provide application 110 to one or more automated tests 106 in the group concurrently, or alternatively can provide application 110 to one or more automated tests 106 in the group sequentially (e.g., waiting until a result from one automated test is received prior to providing application 110 to another automated test in the group).

Application tracking module 120 proceeds based on the results received from the automated tests 106 in a group. If all automated tests 106 in a group return a pass result, then application tracking module 120 determines whether there are any additional groups of automated tests 106 that have not yet evaluated application 110. If there are additional groups of automated tests 106 that have not yet evaluated application 110, then application tracking module 120 communicates with application routing module 122 to provide application 110 to one of those additional groups. Application routing module 122 can provide application 110 to a particular one of those additional groups based on a particular ordering of groups, as discussed above. However, if there are no additional groups of automated tests 106 that have not yet evaluated application 110 (all automated tests 106 to be applied to application 110 have returned a pass result for application 110), then application tracking module 120 provides application 110 to a manual testing phase where one or more manual tests 108 are applied. The manual testing phase is discussed in more detail below.

If one or more automated tests 106 in a group return a fail result, then an indication 130 that application 110 is rejected is returned. Indication 130 can be returned to, for example, the application developer, an entity that submitted application 110, another module or device, and so forth. Indication 130 can take a variety of different forms, such as a message (e.g., email or other message) that is sent, information posted at a particular location (e.g., on a particular Web site, page, wall, etc.), information used by another module or device of system 102 to drive further system processes, and so forth.

Indication 130 also includes an identification of why application 110 is rejected. This identification allows the developer to determine what changes are to be made to application 110, if desired, so that application 110 will be approved. This identification of why application 110 is rejected can take a variety of different forms, such as an identification of which one or more automated tests 106 returned a fail result, the identification of why application 110 failed that was returned by the automated tests 106 that returned the fail result, and so forth. It should be noted that, as automated tests 106 are applied in groups, multiple automated tests 106 in the same group can return a fail result. The identification of why application 110 is rejected includes information related to each of these automated tests 106 that returned a fail result (e.g., an identification of each automated test 106 that returned a fail result, the identification of why application 110 failed that was returned by each automated test 106 that returned a fail result, etc.).

If one or more automated tests 106 in a group return an inconclusive result, then a manual check is initiated in which one or more people apply one or more manual tests 108 to application 110. Manual tests 108 run at least in part with human intervention, and can involve running one or more programs or modules (or a portion of one or more programs or modules), to evaluate an application. Manual tests 108 can operate in a variety of different manners, based on the manner in which the manual test 108 is implemented and the policy for which the manual test 108 is evaluating an application. For example, a manual test 108 can involve a computing device running application 110 and a human observing the output (e.g., images, audio, text, and so forth), a human evaluating metadata associated with application 110, and so forth.

The particular manual tests 108 that are applied for the manual check can be determined by application routing module 122 based at least in part on the one or more automated tests 106 that returned an inconclusive result. For example, application routing module 122 can be configured with (or otherwise obtain, such as from another device or module) an indication of one or more manual tests 108 associated with each automated test. Based on this association, application routing module 122 can readily determine which one or more manual tests 108 to initiate for each of the one or more automated tests 106 that returned an inconclusive result. Alternatively, the particular manual tests 108 that are applied for the manual check can be determined by a computing device or person. For example, application routing module 122 can provide to a manual testing sub-system (e.g., one or more computing devices) an indication of the one or more automated tests 106 that returned an inconclusive result, in response to which a computing device or person at the manual testing sub-system can determine which one or more manual tests 108 are to be applied for the manual check.

Each manual test 108 returns a pass result or a fail result, analogous to automated tests 106. A manual test 108 that returns a fail result can also include information identifying why application 110 failed, which can vary by manual test 108 and by implementation, analogous to the discussion above regarding automated tests 106. Application tracking module 120 proceeds based on the results received from both the automated tests 106 in a group and the manual tests 108 applied as part of the manual check. If all automated tests 106 in a group and all manual tests 108 performed as part of the manual check return a pass result, then application tracking module 120 proceeds to have application routing module 122 provide application 110 to an additional group, or proceed to a manual testing phase as discussed above. If one or more automated tests 106 in a group and/or one or more manual tests 108 applied as part of the manual check return a fail result, then an indication 130 that application 110 is rejected is returned. Indication 130 also includes an identification of why application 110 is rejected, which can include an identification of which one or more manual tests 108 returned a fail result, the identification of why application 110 failed that was returned by the one or more manual tests 108 that returned the fail result, and so forth.

It should be noted that, for a particular group of automated tests 106, application tracking module 120 can receive a pass result from one or more automated tests 106, a fail result from one or more automated tests 106, a pass result from one or more manual tests 108 applied as part of the manual check, a fail result from one or more manual tests 108 applied as part of the manual check, or any combination thereof. Application tracking module 120 maintains a record of the pass results and fail results returned by automated tests 106 in the group, and if a manual check is initiated, then proceeds to have application routing module 122 provide application 110 to an additional group, initiate a manual testing phase, or return an indication 130 of failure after receiving results from the manual tests 108 applied during the manual check.

For example, assume a group includes ten automated tests 106, and that five of those automated tests 106 return a pass result, three of those automated tests 106 return a fail result, and two of those automated tests 106 return an inconclusive result. Application tracking module 120 maintains a record of the five automated tests 106 that returned a pass result and the three automated tests 106 that returned a fail result, and initiates a manual check based on the two automated tests 106 that returned an inconclusive result. Further assume that one manual test 108 that was applied based on the initiated manual check returns a pass result, and another manual test 108 that was applied based on the initiated manual check returns a fail result. Application tracking module 120 returns an indication 130 that application 110 is rejected, including an identification of why application 110 is rejected. The identification of why application 110 is rejected can include an identification of the three automated tests 106 and one manual test 108 that returned a failed result, the identification of why application 110 failed that was returned by each of the automated tests 106 and one manual test 108 that returned a fail result, and so forth.

After all automated tests 106 to be applied to application 110 have returned a pass result for application 110, a manual testing phase is initiated. If an automated test 106 returns an inconclusive result, in response to which one or more manual tests 108 return a pass result after a manual check is initiated, then that automated test 106 can also be referred to as returning a pass result. The manual testing phase can be initiated in different manners, such as application tracking module 120 communicating with application routing module 122 to have one or more manual tests 108 applied to application 110.

In one or more embodiments, all automated tests 106 are applied to application 110, and the manual testing phase is initiated after all of those automated tests 106 each return a pass result. In other embodiments, less than all of automated tests 106 are applied to application 110, in which case the manual testing phase is initiated after those automated tests 106 that are to be applied to application 110 each return a pass result. In embodiments in which less than all of the automated tests 106 are to be applied to application 110, the automated tests 106 that are to be applied to application 110 can be identified in different manners. For example, the automated tests 106 that are to be applied to application 110 can be programmed into application tracking module 120, can be determined by application tracking module 120, can be received from another source (e.g., another device, another module, an administrator of testing system 102, etc.), and so forth.

In the manual testing phase, one or more manual tests 108 are applied to application 110. As discussed above, manual tests 108 run at least in part with human intervention, and can involve running one or more programs or modules (or a portion of one or more programs or modules) on one or more computing devices, to evaluate an application. The manual tests 108 that are applied to application 110 can include the manual tests 108 that were applied as part of one or more manual checks discussed above, or alternatively can be other manual tests 108 than the manual tests 108 used in the manual checks. Manual tests 108 can be applied in groups, analogous to automated tests 106, or alternatively can be applied individually, can be applied collectively (e.g., in which case all of the manual tests 108 to be applied can be viewed as being part of a single group).

All manual tests 108 can be applied to application 110, or alternatively a subset of manual tests 108 can be applied to application 110. The particular manual tests 108 that are applied in the manual testing phase can be determined in different manners. For example, application routing module 122 can identify particular manual tests 108 that are to be applied to application 110 in the manual testing phase based on characteristics of application 110, such as a type of application 110 or language that application 110 is written in (either or both of which can be automatically determined by test management control module 104, can be determined based on metadata associated with application 110, and so forth). By way of another example, application routing module 122 can provide application 110 to a manual testing sub-system (e.g., one or more computing devices), and a computing device or person at the manual testing sub-system can determine which one or more manual tests 108 are to be applied for the manual testing phase.

Each manual test 108 in the manual testing phase returns a pass result or a fail result, analogous to the discussion above. If one or more manual tests 108 in the manual testing phase returns a fail result, then application tracking module 120 returns an indication 130 that application 110 is rejected, including an identification of why application 110 is rejected as discussed above. However, if all manual tests 108 that are applied to application 110 in the manual testing phase return a pass result, then application tracking module 120 returns an indication 130 that application 110 is approved. Application tracking module 120 can also take other actions in light of the approval of application 110, such as provide indication 130 to one or more other devices or modules, provide application 110 to an online or electronic store, provide indication 130 or application 110 to another module or device, and so forth. Additionally, the indication 130 that application 110 is approved can include a certification by test management control module 104 that application 110 is approved. This certification can take a variety of different forms, such as test management control module 104 generating a digital signature for application 110.

In one or more embodiments, different manual tests 108 can be implemented by different entities (e.g., different people, different testing companies or organizations, and so forth). These different entities can apply different manual tests 108, or different versions (e.g., based on different languages) of the same manual tests 108. Application routing module 122 can determine, based at least in part on characteristics of application 110 (e.g., including metadata associated with application 110), which entity is to apply which manual tests 108 and/or which versions of manual tests 108 to application 110. For example, if application 110 displays text in French, then application routing module 122 determines that an entity that is fluent in French is to apply particular ones of manual tests 108. By way of another example, application 110 can determine that an entity that has agreed to potentially be exposed to profanity or other adult-themed content for the purposes of testing is to apply particular ones of manual tests 108.

Figure 2:
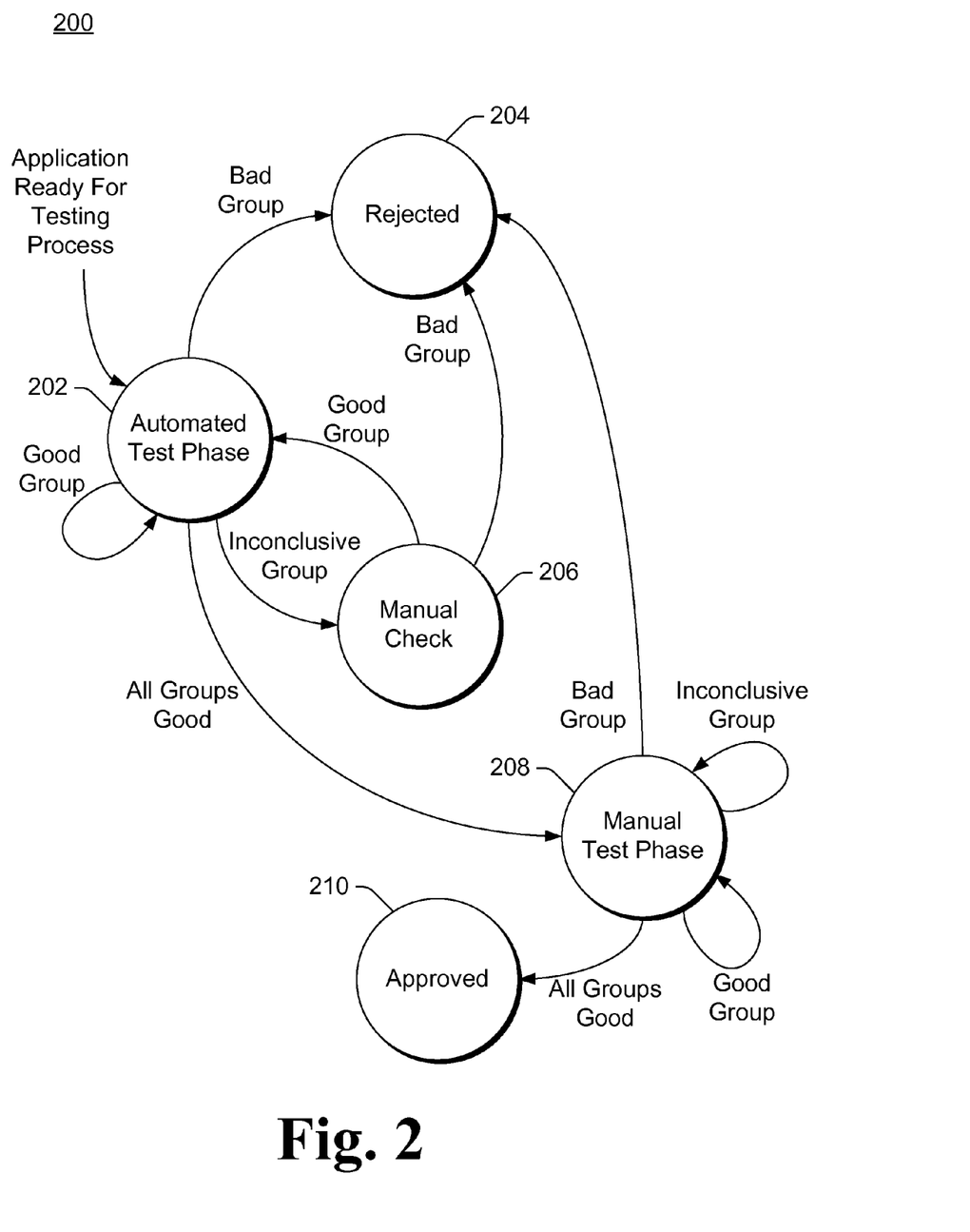
FIG. 2 is a flow diagram illustrating an example flow for implementing the managing automated and manual application testing in accordance with one or more embodiments.

FIG. 2 is a flow diagram illustrating an example flow 200 for implementing the managing automated and manual application testing in accordance with one or more embodiments. In flow 200, an application that is submitted as ready for the testing process enters an automated test phase stage 202. In the automated test phase stage 202, automated tests (e.g., automated tests 106 of FIG. 1) are applied to the application in groups of multiple automated tests. As each group of automated tests is applied to the application, if the automated tests in that group all return pass results then the group of automated tests is referred to as a good group and the automated test phase stage 202 continues.

However, if one or more automated tests in a group of multiple automated tests returns a fail result, then the group of automated tests is referred to as a bad group and the testing process enters a rejected stage 204. In rejected stage 204, an indication that the application is rejected is returned (e.g., to the application developer).

Furthermore, if one or more automated tests in a group of multiple automated tests returns an inconclusive result, then the group of automated tests is referred to as an inconclusive group and the testing process enters a manual check stage 206. In manual check stage 206, one or more manual tests (e.g., one or more manual tests 108 of FIG. 1) are applied to the application. If the one or more manual tests all return pass results then the group of automated tests is referred to as a good group and the automated test phase stage 202 continues. However, if at least one of the one or more manual tests returns a fail result then the group of automated tests is referred to as a bad group and the testing process enters rejected stage 204.

If all of the groups of automated tests applied to the application are good groups, then the testing process enters a manual test phase stage 208. In manual test phase stage 208, one or more manual tests (e.g., one or more manual tests 108 of FIG. 1) are applied to the application in one or more groups. As each group of manual tests is applied to the application, if the manual tests in that group all return pass results then the group of manual tests is referred to as a good group and the manual test phase stage 208 continues. In one or more embodiments, a manual test may return an inconclusive result. In such embodiments, if a manual test returns an inconclusive result then the group of manual tests is referred to as an inconclusive group, and manual testing of the application continues (e.g., applying one or more different manual tests in response to the inconclusive result).

If one or more manual tests in a group of multiple manual tests returns a fail result, then the group of manual tests is referred to as a bad group and the testing process enters rejected stage 204. However, if all of the groups of manual tests applied to the application are good groups, then the testing process enters an approved stage 210. In approved stage 208, an indication that the application is approved is returned (e.g., to the application developer).

Figure 3:
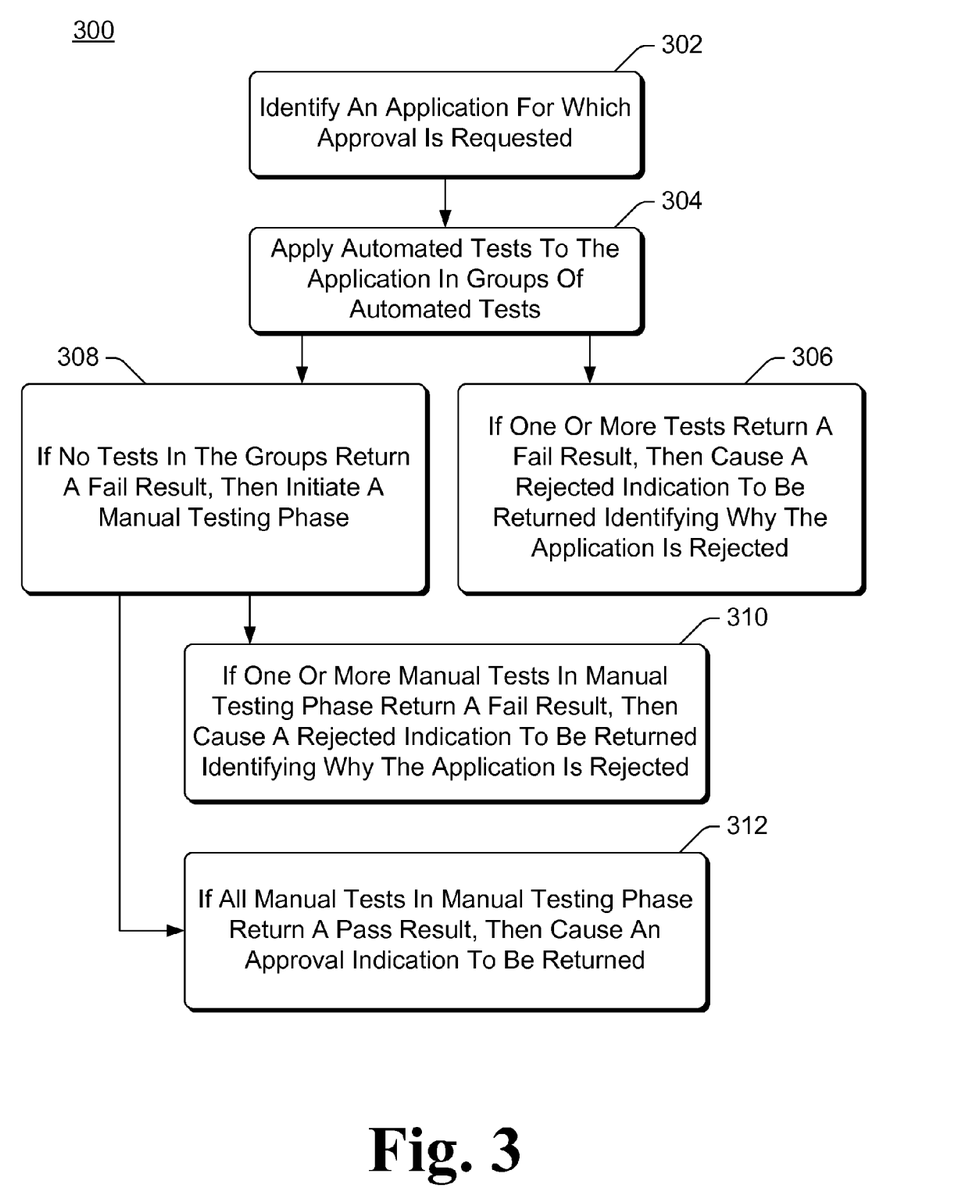
FIG. 3 is a flowchart illustrating an example process for a system implementing the managing automated and manual application testing in accordance with one or more embodiments.

FIG. 3 is a flowchart illustrating an example process 300 for a system implementing the managing automated and manual application testing in accordance with one or more embodiments. Process 300 is carried out by a testing system, such as testing system 102 of FIG. 1, and can be implemented in software, firmware, hardware, or combinations thereof. Process 300 is shown as a set of acts and is not limited to the order shown for performing the operations of the various acts. Process 300 is an example process for implementing the managing automated and manual application testing; additional discussions of implementing the managing automated and manual application testing are included herein with reference to different figures.

In process 300, an application for which approval is requested is identified (act 302). The application can be identified in different manners, such as the application being provided to the testing system (e.g., emailed or uploaded), an identifier of the application (e.g., link to where the application can be retrieved or otherwise obtained) being provided to the testing system, and so forth.

Automated tests are applied to the application in groups of multiple automated tests (act 304). The automated tests can be grouped into multiple groups in different manners as discussed above.

Process 300 proceeds, after applying a group of automated tests, based on the results returned by the automated tests in that group. If one or more tests in one or more groups returns a fail result, then the testing system causes a rejected indication to be returned, including an identification of why the application is rejected (act 306). The one or more tests that return a fail result can be one or more automated tests that themselves return a fail result, or one or more manual tests that were applied as at least part of a manual check in response to an automated test returning an inconclusive result. The testing system can cause the rejected indication to be returned by returning the rejected indication itself, or alternatively invoking one or more other systems or devices to return the rejected indication.

However, if no tests in the groups return a fail result, then a manual testing phase is initiated (act 308). The tests in act 308 refer to both the automated tests, as well as manual tests that were applied as a manual check in response to an automated test returning an inconclusive result. The manual testing phase can be initiated in different manners as discussed above.

If one or more manual tests in the manual testing phase return a fail result, then the testing system causes a rejected indication to be returned, including an identification of why the application is rejected (act 310). The testing system can cause the rejected indication to be returned by returning the rejected indication itself, or alternatively invoking one or more other systems or devices to return the rejected indication.

However, if all of the manual tests in the manual testing phase return a pass result, then the testing system causes an approval indication to be returned (act 312). If one or more manual tests in the manual testing phase return an inconclusive result, followed by one or more other manual tests (or a repeating of that manual test) that results in a pass result, then the manual test that returned the inconclusive result can also be referred to as returning a pass result. The testing system can cause the approval indication to be returned by returning the approval indication itself, or alternatively invoking one or more other systems or devices to return the approval indication.

Figure 4:
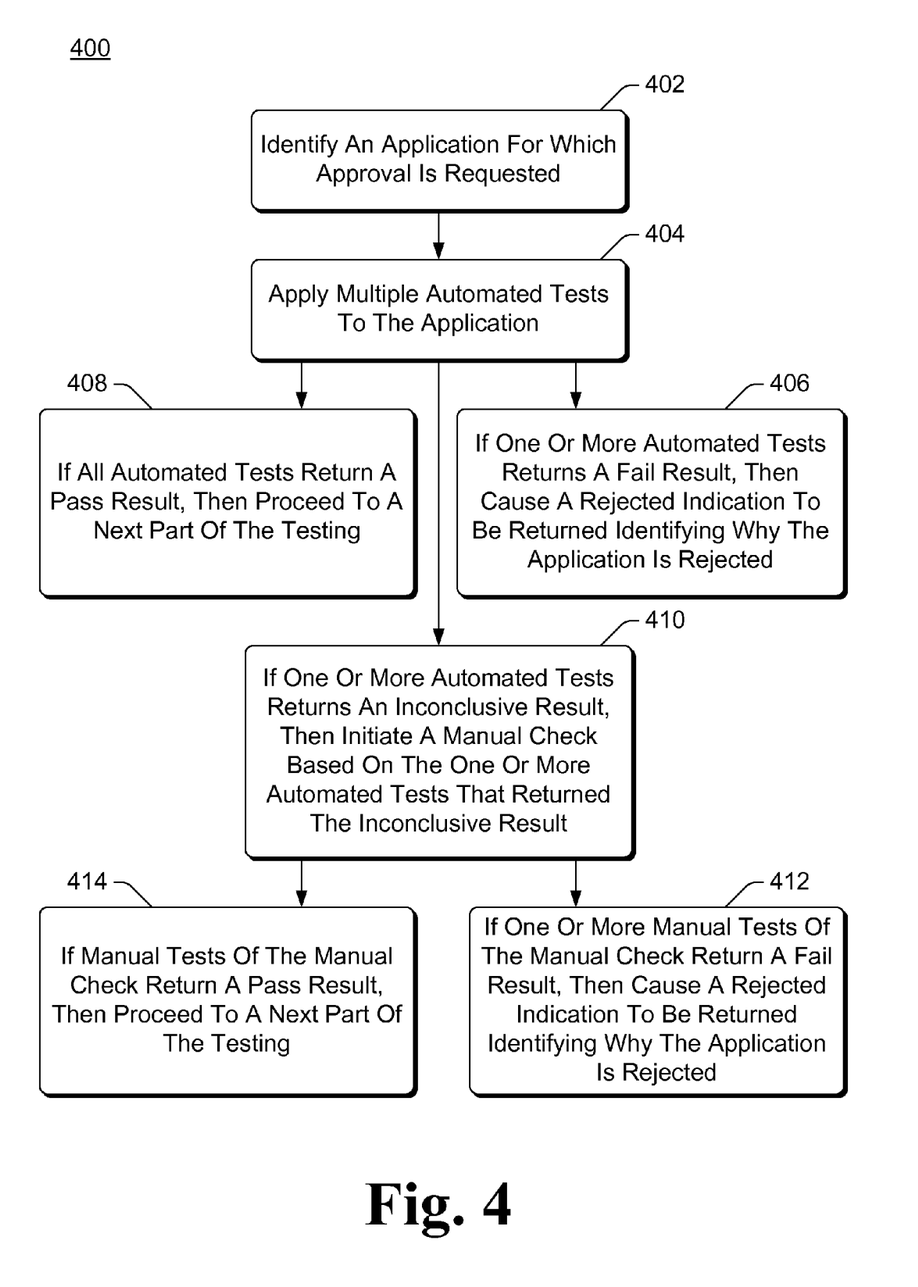
FIG. 4 is a flowchart illustrating another example process for a system implementing the managing automated and manual application testing in accordance with one or more embodiments.

FIG. 4 is a flowchart illustrating another example process 400 for a system implementing the managing automated and manual application testing in accordance with one or more embodiments. Process 400 is carried out by a testing system, such as testing system 102 of FIG. 1, and can be implemented in software, firmware, hardware, or combinations thereof. Process 400 is shown as a set of acts and is not limited to the order shown for performing the operations of the various acts. Process 400 is an example process for implementing the managing automated and manual application testing; additional discussions of implementing the managing automated and manual application testing are included herein with reference to different figures.

In process 400, an application for which approval is requested is identified (act 402). The application can be identified in different manners, such as the application being provided to the testing system (e.g., emailed or uploaded), an identifier of the application (e.g., link to where the application can be retrieved or otherwise obtained) being provided to the testing system, and so forth.

Multiple automated tests are applied to the application (act 404). The automated tests can be applied in groups of multiple automated tests as discussed above, or alternatively can be applied individually, or can be applied collectively (e.g., in which case all of the automated tests to be applied can be viewed as being part of a single group).

Process 400 proceeds based on the results returned by the automated tests. If one or more automated tests returns a fail result, then the testing system causes a rejected indication to be returned, including an identification of why the application is rejected (act 406). The testing system can cause the rejected indication to be returned by returning the rejected indication itself, or alternatively invoking one or more other systems or devices to return the rejected indication.

If all automated tests return a pass result, then the testing system proceeds to a next part of the testing (act 408). The next part of the testing is, for example, a manual testing phase as discussed above.

If one or more automated tests returns an inconclusive result, then the testing system initiates a manual check based on the one or more automated tests that returned the inconclusive result (act 410). One or more manual tests can be determined based on the one or more automated tests that returned the inconclusive result as discussed above.

If the one or more manual tests of the manual check return a pass result, then the testing system proceeds to a next part of the testing (act 414). The next part of the testing is, for example, applying automated tests of one or more additional groups to the application, or a manual testing phase as discussed above.

However, if one or more manual tests of the manual check return a fail result, then the testing system causes a rejected indication to be returned, including an identification of why the application is rejected (act 412). The testing system can cause the rejected indication to be returned by returning the rejected indication itself, or alternatively invoking one or more other systems or devices to return the rejected indication.

The managing automated and manual application testing discussed herein supports various usage scenarios. The application of automated tests in groups allows application developers to get feedback regarding multiple issues they may have with their application resulting from multiple tests at the same time. For example, several different security related issues may be identified by multiple different automated tests in one group, and all of those security related issues can be identified to the application developer at the same time. This allows the application developer to resolve those security related issues together, rather than being notified of the issues one at a time.

Furthermore, applying an automated test is typically less expensive than running a manual test. Thus, the techniques discussed herein provide for the initial use of less expensive automated tests, but intermixed with manual tests of a manual check when appropriate (in the event of an inconclusive result received from an automated test). For example, if the testing system will reject all adult-themed (e.g., pornographic) applications, then an automated test for adult-themed content can be applied as part of a first couple groups of automated tests that are applied to an application. If the automated test cannot determine if the application is an adult-themed application, then the automated application can return an inconclusive result, causing a manual test to be performed before all of the automated tests have been completed. If the application has an adult theme, then the manual test can return an indication that the application will not be approved due to its adult theme. The application developer thus need not spend additional time changing the application in an attempt to satisfy the other automated tests (e.g., tests relating to whether the application satisfies certain performance requirements when the application is running, tests relating to whether the application employs disallowed APIs, etc.), as the application developer knows that the application will still be rejected due to the adult theme of the application.

Figure 5:
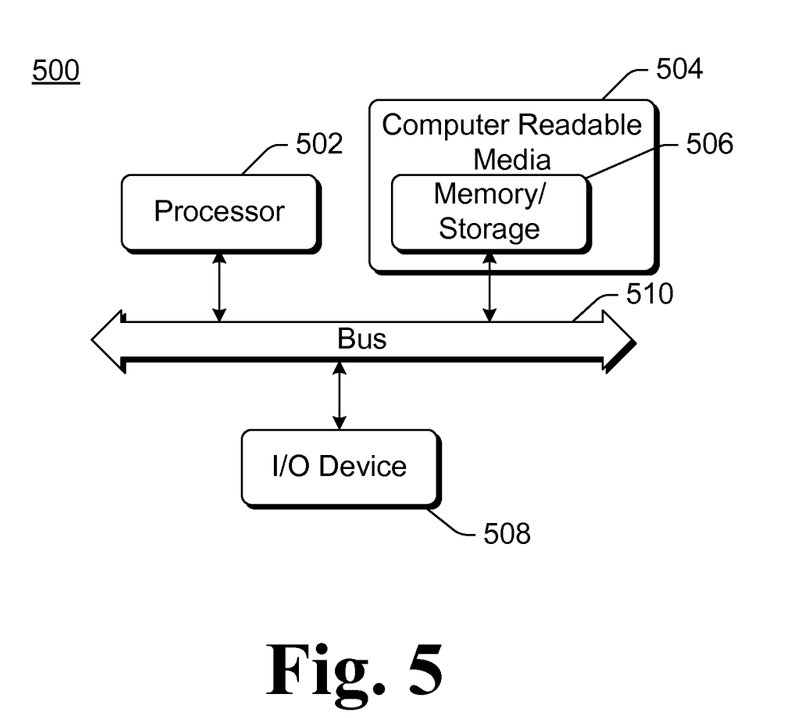
FIG. 5 illustrates an example computing device that can be configured to implement the managing automated and manual application testing in accordance with one or more embodiments.

FIG. 5 illustrates an example computing device 500 that can be configured to implement the managing automated and manual application testing in accordance with one or more embodiments. Computing device 500 can implement, for example, at least part of application tracking module 120, application routing module 122, one or more automated tests 106, and/or one or more manual tests 108 of FIG. 1.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or non-volatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Figure 6:
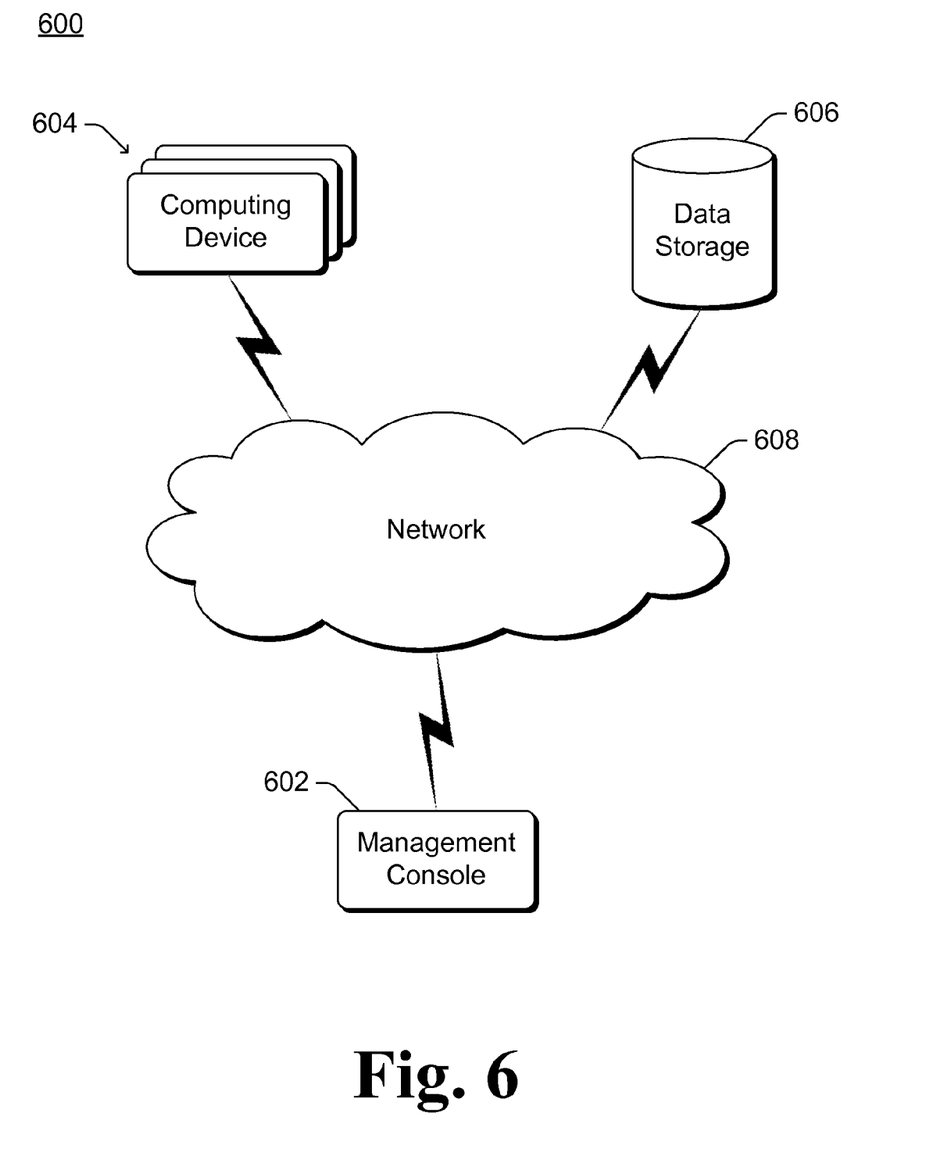
FIG. 6 illustrates an example system that can be configured to implement the managing automated and manual application testing in accordance with one or more embodiments

FIG. 6 illustrates an example system 600 that can be configured to implement the managing automated and manual application testing in accordance with one or more embodiments. System 600 includes a management console 602, one or more computing devices 604, and a data storage device 606 that can communicate with one another via a network 608. Network 608 can be a variety of different networks, including a local area network (LAN), the Internet, a public telephone network, an intranet, other public and/or proprietary networks, combinations thereof, and so forth.

Computing devices 604 can each be a variety of different types of devices, and can each be a computing device 500 of FIG. 5. For example, each of computing devices 604 can be a server computer, a desktop computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. Different computing devices 604 can be the same type of computing device or alternatively different types of computing devices. Each computing device 604 can perform one or more (or at least part of one or more) tests, such as one or more of (or at least part of one or more of) automated tests 106 and/or manual tests 108 of FIG. 1. Although multiple computing devices 604 are illustrated in FIG. 6, alternatively system 600 can include a single computing device 604.

Data storage device 606 can be a dedicated storage device (e.g., a database, a networked hard drive, etc.) or other type of device (e.g., any of the various types of devices discussed above with respect to computing devices 604), and can be a computing device 500 of FIG. 5. Data storage device 606 maintains various information used by computing devices 604 related to the testing discussed herein. For example, data storage device 606 can include instructions and/or data for one or more tests (such as for automated tests 106 and/or manual tests 108 of FIG. 1), an application for which approval is requested (e.g., an application 110 of FIG. 1), and so forth. Although a single data storage device 606 is illustrated in FIG. 6, alternatively system 600 can include multiple data storage devices 606.

Management console 602 can be a variety of different types of devices (e.g., any of the various types of devices discussed above with respect to computing devices 604), and can be a computing device 500 of FIG. 5. Management console 602 allows an administrator to oversee the automated and manual application testing discussed herein, providing various settings and/or configuration information, inputs, and so forth as appropriate. Management console 602 can also implement a test management control module, such as test management control module 104 of FIG. 1. Although a single management console 602 is illustrated in FIG. 6, alternatively system 600 can include multiple management consoles 602.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. The features of the managing automated and manual application testing techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
identifying, via a testing system that includes a processor, an application for which approval is requested;
testing the application by applying multiple automated tests to the application in groups of automated tests, each of the groups of automated tests including multiple ones of the multiple automated tests;
identifying, prior to completing all of the multiple automated tests and for one or more of the multiple automated tests that returns an inconclusive result, that a manual check is to be performed for the application based on the one or more automated tests, the inconclusive result indicating that the one or more automated tests cannot determine whether the application is to receive a fail result or a pass result;
for each of the groups of automated tests causing, after applying the automated tests in the group, an indication that the application is rejected to be returned if one or more of the automated tests in the group returns a fail result, the indication that the application is rejected including an identification of why the application is rejected;
identifying, if none of the multiple automated tests returns a fail result, that a manual testing phase is to be performed; and
causing, after the manual testing phase, an indication that the application is approved to be returned if none of multiple manual tests in the manual testing phase returns a fail result.

2. A method as recited in claim 1, further comprising causing the indication that the application is rejected to be returned when two or more of the automated tests return a fail result, the indication that the application is rejected including an identification of each of the two or more of the automated tests that returned a fail result or an identification, returned by each of the two or more automated tests that returned a fail result, of why the automated test returned a fail result.

3. A method as recited in claim 1, wherein the identification of why the application is rejected includes an identification of each of the one or more automated tests in the group that returned a fail result.

4. A method as recited in claim 1, wherein the identification of why the application is rejected includes an identification, returned by each of the one or more automated tests in the group that returned a fail result, of why the automated test returned a fail result.

5. A method as recited in claim 1, further comprising, if one or more of the multiple automated tests returns an inconclusive result:
wherein the manual check includes one or more manual tests;
continuing applying the multiple automated tests to the application in groups of automated tests if the one or more manual tests return a pass result; and
causing an indication that the application is rejected to be returned if at least one of the one or more manual tests returns a fail result.

6. A method as recited in claim 1, further comprising determining, based on the one or more automated tests that returned the inconclusive result, one or more manual tests to be applied as part of the manual check.

7. A method as recited in claim 1, wherein the multiple automated tests are grouped into the groups of automated tests based on types of each of the multiple automated tests.

8. A method as recited in claim 1, wherein applying the multiple automated tests to the application in groups of automated tests comprises applying tests related to security checking of the application prior to applying other types of automated tests.

9. A method as recited in claim 1, further comprising routing, as part of the manual testing phase, the application to one or more entities to perform one or more manual tests, wherein the one or more entities are determined based at least in part on characteristics of the application.

10. A method as recited in claim 1, wherein the approval comprises approval to be included in an online store.

11. A method as recited in claim 1, wherein identifying that the manual testing phase is to be performed is responsive to identifying that no manual tests of the manual check return a fail result.

12. One or more computer readable storage media having stored thereon multiple instructions that, when executed by one or more processors, cause the one or more processors to:
identify an application for which approval is requested;
apply multiple automated tests to the application;
determine, prior to completing all of the multiple automated tests and for one or more of the multiple automated tests that returns an inconclusive result, that a manual check is to be performed for the application based on the one or more automated tests, the inconclusive result indicating that the one or more automated tests cannot determine whether the application is to receive a fail result or a pass result;
cause an indication that the application is rejected to be returned if one or more of the multiple automated tests returns a fail result; and cause, after a manual testing phase, an indication that the application is approved to be returned if none of multiple manual tests in the manual testing phase returns a fail result.

13. One or more computer readable storage media as recited in claim 12, wherein the multiple instructions further cause the one or more processors to cause an indication that the application is rejected to be returned if one or more manual tests of the manual check returns a fail result.

14. One or more computer readable storage media as recited in claim 12, wherein the multiple instructions further cause the one or more processors to continue to apply the multiple automated tests to the application if none of the manual tests of the manual check returns a fail result.

15. One or more computer readable storage media as recited in claim 12, wherein to apply the multiple automated tests to the application is to apply the multiple automated tests in groups of automated tests, each of the groups of automated tests including two or more of the multiple automated tests.

16. One or more computer readable storage media as recited in claim 12, wherein to determine that the manual check is to be performed is based on two or more automated tests that each return an inconclusive result, the manual check performed by applying multiple manual tests including at least one manual test determined based at least in part on each of the two or more automated tests, and wherein the multiple instructions further cause the one or more processors to:

cause an indication that the application is rejected to be returned if one or more of the multiple manual tests returns a fail result; and continue to apply the multiple automated tests to the application if none of the multiple manual tests returns a fail result.

17. One or more computer readable storage media as recited in claim 12, wherein the multiple instructions further cause the one or more processors to determine, if none of the multiple automated tests returns a fail result and no manual tests of the manual check returns a fail result, that the manual testing phase is to be performed.

18. One or more computer readable storage media as recited in claim 17, wherein the multiple instructions further cause the one or more processors to route, as part of the manual testing phase, the application to one or more entities to perform one or more manual tests, wherein the one or more entities are determined based at least in part on characteristics of the application.

19. One or more computer readable storage media as recited in claim 12, wherein the multiple instructions further cause the one or more processors to determine, based at least in part on the one or more of the multiple automated tests that returns an inconclusive result, one or more manual tests to be applied as the manual check.

20. A method comprising:

identifying, via a testing system that includes a processor, an application for which approval is requested;

testing the application by applying multiple automated tests to the application in groups of automated tests, each of the groups of automated tests including multiple ones of the multiple automated tests, and determining, prior to completing all of the multiple automated tests and for one or more of the multiple automated tests that returns an inconclusive result, that a manual check is to be performed for the application based on the one or more automated tests, the inconclusive result indicating that the one or more automated tests cannot determine whether the application is to receive a fail result or a pass result;

for each of the groups of automated tests causing, after applying the automated tests in the group, an indication that the application is rejected to be returned if one or more of the automated tests in the group returns a fail result or one or more of multiple tests in the manual check returns a fail result, the indication that the application is rejected including an identification of why the application is rejected;

determining, if none of the multiple automated tests returns a fail result, that a manual testing phase is to be performed;

causing, after receiving an indication that the manual testing phase is complete, an indication that the application is rejected to be returned if one or more manual tests of the manual testing phase returns a fail result, the indication that the application is rejected including an identification of why the application is rejected; and causing, after receiving an indication that the manual testing phase is complete, an indication that the application is approved to be returned if none of multiple manual tests in the manual testing phase returns a fail result.

\* \* \* \* \*